Jan. 19, 1932.  F. L. McCAFFERTY  1,841,662
RAILWAY VEHICLE TRUCK
Filed March 20, 1929  2 Sheets-Sheet 1
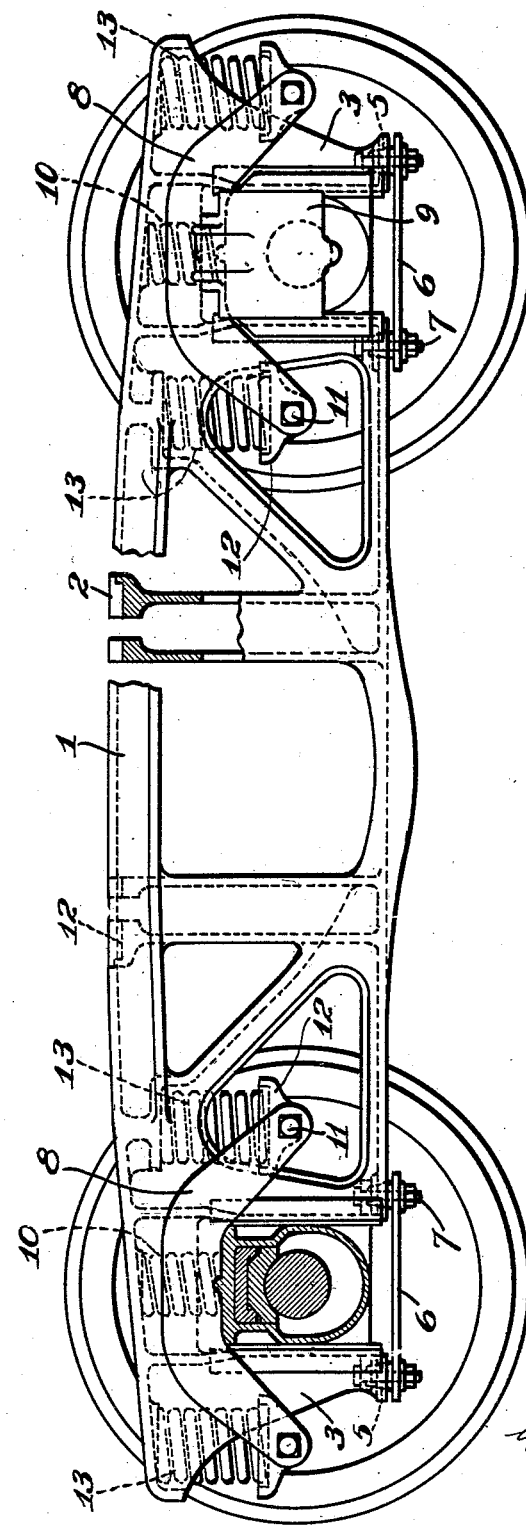

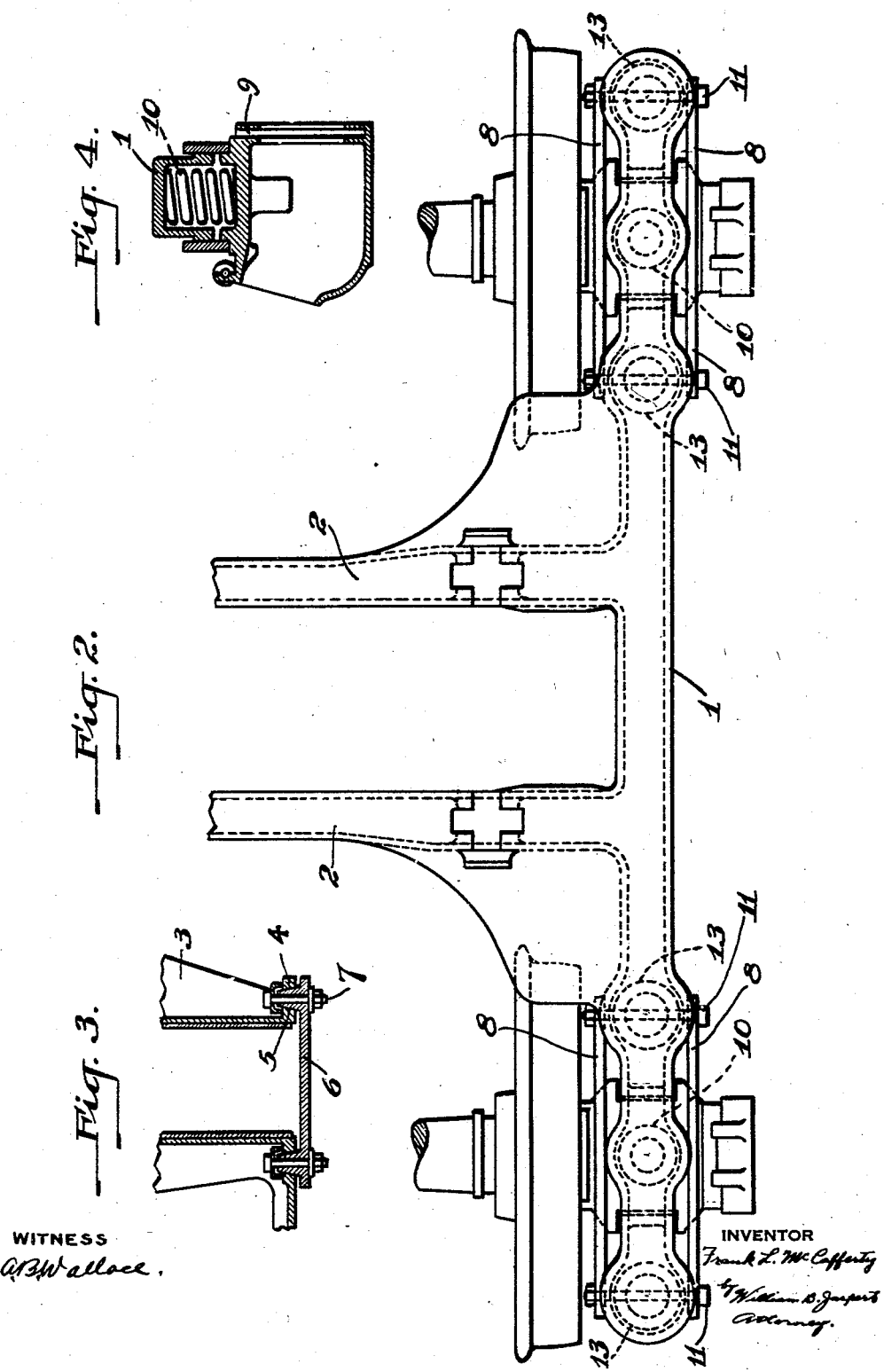

Patented Jan. 19, 1932

1,841,662

UNITED STATES PATENT OFFICE

FRANK L. McCAFFERTY, OF BUTLER, PENNSYLVANIA

RAILWAY VEHICLE TRUCK

Application filed March 20, 1929. Serial No. 348,484.

This invention relates to improvements in railway vehicle trucks and more particularly to the truck frame construction, and its spring support on the wheel axle journals.

It is among the objects of the invention to provide a truck structure which is designed to reduce the bending moment of the frame at the section over the center of the journal boxes.

Another object of the invention is to provide a vehicle truck in which the pedestal tie is so formed and joined with the pedestals as to constitute an integral part of the lower cord.

A still further object of the invention is to provide a railway vehicle truck which is supported by springs on a yoke to provide increased spring capacity and which shall provide for the application of springs of greater flexure resulting in easier riding of the car.

These and other objects will become more apparent from a consideration of the accompanying drawings in which like reference characters designate like parts and in which Fig. 1 is a side elevational view partly in section of a railway vehicle truck embodying the principles of this invention; Fig. 2 is a top plan view of the truck to the longitudinal center line thereof; Fig. 3 is a cross sectional view through the pedestal tie illustrating the manner of interlocking it with the pedestal and Fig. 4 is a transverse sectional view through the journal box illustrating a section of the side frame and the manner of locating the spring on the journal box saddle.

Referring to the several figures of the drawings, the structure therein illustrated comprises integral side frames 1 and transoms 2 of U-shaped section, the side frames being cast as a truss with the pedestals and transoms all cast integrally. Pedestal members 3 are provided at their lower portion with a socket 4 which is reamed to an accurate taper fit and which is adapted to receive conically shaped tie bosses 5 that are forged integrally with the pedestal ties 6. The tie bosses 5 are provided with openings for receiving bolts 7 by means of which the pedestal tie is interlocked with the pedestals constituting them an integral part of the lower cord of the side frame whereby the bending moment of the section in the center line of the journal box is reduced by one-half.

Yokes 8 blanked or forged from open hearth steel are supported on top of the journal boxes 9 and the side frame proper is supported on a spring 10 resting on the spring saddle of the journal box. The yokes 8 are disposed on both sides of the frame as shown in Fig. 2 and are connected by bolts 11 which pass through spring terminals or seats 12. Springs 13 are disposed between the side frame and spring seats in spaced relation with the spring 10 of the journal box and the latter is designed to come into action slightly in advance of the live load. With this longitudinal spacing of the spring base, the moment arm of the spring load is increased making the springs more sensitive to load application, resulting in easier riding of the car.

The spring seats 12 on account of their mounting by the equalizer bolts 11 are free to pivot and adjust themselves to the position of the spring. With the spring construction shown, the vehicle has a minimum unsprung load.

It is evident from the foregoing description of this invention that a truck structure embodying the principles herein described, is of light weight, great strength, and possesses easy riding qualities which adapt it especially for passenger car trucks, and it is further obvious that modifications in detail of construction may be made without departing from the principles herein set forth.

I claim herein as my invention:

In a railway vehicle truck, the combination of side frames, journal boxes and yokes supported on said boxes, tie bolts connecting the extended ends of said yokes and springs disposed between the journal box and frame and between the tie-bolts and frame in longitudinal spaced relation, said journal box spring being adapted to come into action slightly in advance of the live load.

In testimony whereof I have hereunto set my hand this 25th day of February, 1929.

FRANK L. McCAFFERTY.